Aug. 5, 1958     L. S. BROWN ET AL     2,845,670
ELASTIC LOOP FASTENER AND METHOD OF MAKING THE SAME
Filed July 25, 1956     2 Sheets-Sheet 1
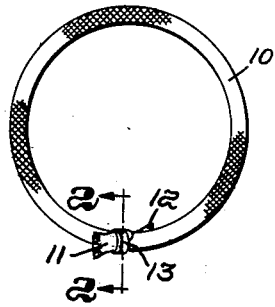
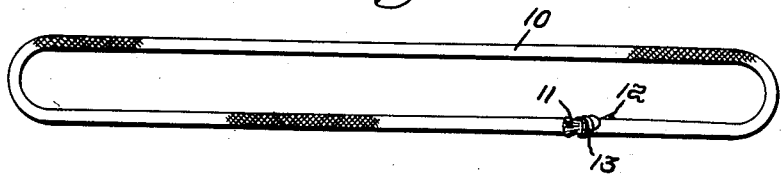
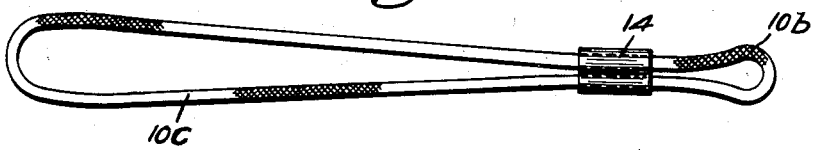
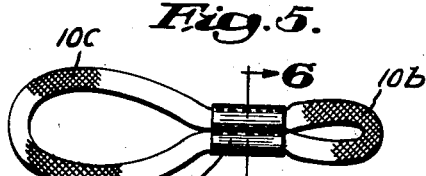
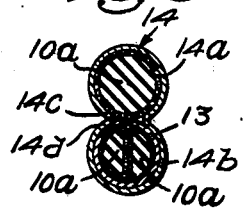
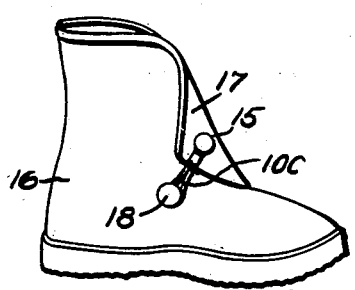
Inventors:
Leslie Brown,
Kenneth A. Ives,
by Arthur D. Thomson Attorney Aug. 5, 1958   L. S. BROWN ET AL   2,845,670
ELASTIC LOOP FASTENER AND METHOD OF MAKING THE SAME
Filed July 25, 1956                    2 Sheets-Sheet 2
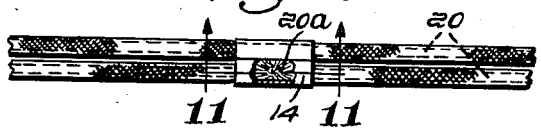
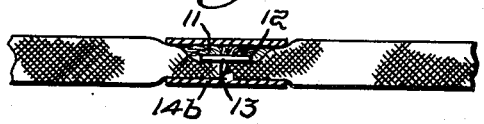
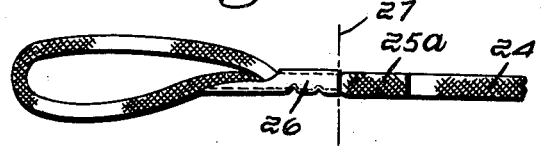
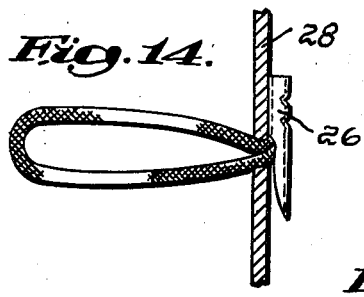
Inventors:
Leslie S. Brown,
Kenneth A. Ives,
by Arthur D. Thomson
Attorney

United States Patent Office 2,845,670
Patented Aug. 5, 1958

2,845,670

ELASTIC LOOP FASTENER AND METHOD OF MAKING THE SAME

Leslie S. Brown, Newton, and Kenneth A. Ives, Reading, Mass., assignors to Hook-Brown Company, Boston, Mass., a corporation of Massachusetts Application July 25, 1956, Serial No. 600,133

12 Claims. (Cl. 24—16)

This invention relates to the elastic loop of garment fasteners, especially to fasteners adapted for use on garments such as footwear and raincoats.

Elastic loop fasteners are quite commonly used as garment fasteners, especially on overshoes. One popular style of rainboot, for example, has, instead of a front opening, an enlarged top, the front part of which is folded over and secured at the side of the boot by an elastic cord which is passed around a button. The main problem in forming elastic loops of this kind is to join the free ends of a piece of cord in a satisfactory manner. It is impractical to sew the ends together because the rubber core of the cord tends to slip out from under the needle, and the stitching catches only the cover. If the stitching does pierce the core, the latter will tear very easily and pull away from the joint. Clamps with teeth for biting into the cord have proven unsatisfactory, as the teeth hold only on the braided cover and the elastic cord pulls away from the cover. Smooth clamps are presently employed but the ends of the cord tend to slip out when the cord is stretched, due to the fact that the cord shrinks in diameter as it is elongated. The cord also tends to work loose from such clamps rather quickly when repeatedly stretched, as by motion of the foot in walking. Loops thus secured, furthermore, will withstand only a relatively light pull, considerably less than the cord itself will stand.

The principal object of this invention is to provide a means and method for joining the ends of elastic cords to make loop fasteners which produces a joint as strong, or nearly as strong, as the cord itself, which provides a neat, attractive and compact joint, and which permits inexpensive production of the loops in quantity. In practicing the invention, a clamp is applied to the free ends of the cord and tightened while the cord is in stretched condition. In making one form of loop, the ends of the cord are first connected together by a circular staple which is clinched moderately tightly. The loop is then stretched and a clamp is applied over the staple, securing the two sides of the loop together to form the double-ended loop, and further clinching the staple. The application of the clamp with the cord stretched, permits the clamp to be closed to a smaller diameter than the normal diameter of the cord, and ensures that the parts of the cord inside the clamp are maintained stretched so that subsequent stretching of other parts of the loop do not cause movement of the cord in the region inside the clamp.

In the drawings illustrating the invention:

Fig. 1 is a plan view of the loop as it appears after the initial step of joining the ends of the cord;

Fig. 2 is a cross-section taken along line 2—2, Fig. 1;

Fig. 3 is a plan view of the loop in stretched condition prior to application of the clamp;

Fig. 4 is a plan view of the stretched fastener after the clamp has been applied;

Fig. 5 is a plan view of the completed fastener when it is returned to normal condition;

Fig. 6 is an enlarged cross-section taken along line 6—6 of Fig. 5;

Fig. 7 is a side view of a boot with one type of completed loop fastener attached;

Fig. 8 is a plan view of a modified form of the loop as it appears after the initial step of joining the ends;

Fig. 9 is a side view of the loop of Fig. 8 in stretched condition prior to application of the clamp;

Fig. 10 is an enlarged fragmentary plan view, partly broken away, of a finished loop fastener made from the loop of Fig. 8;

Fig. 11 is a cross-section taken along line 11—11 of Fig. 10;

Fig. 12 is a plan view of a modified form of the fastener in the first stage of manufacture;

Fig. 13 is a side view of the fastener of Fig. 12 partially completed; and

Fig. 14 is a side view of the completed fastener of Fig. 12 installed on a garment.

As the first step in making the fastener, a piece of cord 10 is placed with its ends 11 and 12 overlapping and a circular staple 13 is clamped around the overlapping ends. The staple is applied with moderate clinching pressure so that the elastic core 10a of the cord is slightly compressed in the region inside the staple, as indicated in Fig. 2. The free portions of ends 11 and 12 projecting beyond the staple keep their normal diameter and thus will resist any force tending to pull them through the staple. The joined loop is then stretched as shown in Fig. 3, for example, by grasping opposite portions of the loop by hand or with appropriate tools.

A clamp 14 suitable for bending to the general form of two parallel connected tubes 14a and 14b is then placed over the two sides of the loop to form a double loop consisting of a long portion 10c and a short portion 10b. As shown in Fig. 6, the tubular portions of the clamp have free edges 14c and 14d which are bent in to the desired degree, preferably to about the diameter of the stretched cord. The cord in the lower portion 14b, being of double thickness on account of the overlapping ends is compressed by the clamp. Furthermore, the tubular portion 14b encloses staple 13 and forces the staple to clinch more tightly than it did originally. A very tight grip is thus provided on the ends of the cord. When the loop is released and springs back to normal, the portions of the cord inside the clamp at either side of the staple remain stretched, and the cord may appear to bulge slightly immediately outside the ends of the clamp. The portions inside the clamp thus will not move upon subsequent stretching of the two parts 10b and 10c of the loop. In use, as shown in Fig. 7, the part 10b of the fastener is passed around a button 15 attached to the flap portion 17 of the boot. The boot is provided with a button 18 on the side and the other part 10c of the fastener is passed around the button 18 to hold the flap wrapped around the ankle. Alternatively, the two parts 10b and 10c of the loop may be made of the same length, and one of the parts passed through a hole in the boot flap on the shoe, and then doubled through itself.

In the form of loop illustrated in Fig. 8, the ends 11 and 12 of the cord are laid side by side. The loop thus formed is preferably stretched endwise, as indicated by the arrows in Fig. 8, while the staple 13 is being applied.

This may be done in the manner to be described with respect to Figs. 12 through 14. The loop is then turned and stretched sidewise, as indicated in Fig. 9, causing the ends 11 and 12 to stand up generally at right angles with respect to the body of the loop, and turning the staple 13 to lie parallel to the body of the loop. In this case the cord is shown as having a core 20 made up of a number of strands of elastic 20a, but a cord with a solid core may be formed into a loop in the same manner. The tubular clamp 14 is then applied as before around the joint and an opposite portion of the loop, while the loop is under tension. This forms a double-ended loop fastener indistinguishable in appearance from that shown in Fig. 5. As shown in Figs. 10 and 11, however, ends 11 and 12 of the cord are bent back alongside the parts to which they are attached, instead of overlapping, as in Fig. 1, and staple 13 lies in the axial direction of the tubular clamp instead of transversely across the clamp as in Fig. 6. The strength of the joint in this fastener is even greater than that of the fastener shown in Figs. 1 through 4, because of the fact that the pull is at right angles to the staple.

In both forms of the fastener described above, the staple 13 is somewhat spaced from the extreme ends of the cord, so that part of each end portion projects beyond the staple and retains its natural diameter after the first clinching step. A projection of about one-sixteenth of an inch is adequate for an eighth of an inch diameter cord. Naturally the length of the projecting parts should be kept small, so that no raw ends will show after the clamp is applied.

These fasteners are very strong and durable. The joined ends of the cord do not pull out of the clamp under loads up to the breaking point of the cord itself, whereas previous fasteners of this type were good for only a fraction of the tensile strength of the cord. The superior strength of the joint is believed to be due in part to the fact that the material is immobilized, so that it does not work back and forth and the staple does not cut into the rubber even though clinched very tightly. Also, the stress is distributed so that the load is carried in part by the clamped regions on either side of the staple, the latter coming into action gradually as the load is increased.

The loop 25 of the fastener shown in Figs. 12 through 14 is made by doubling over the end of a long piece of cord 24, and grasping the free end 25a and the portion 24a which it lies beside, either by hand or by an appropriate tool, and stretching the loop. While the loop is thus stretched, a clamp 26 is applied. This clamp has wings 26a which are wrapped around the doubled-over cord, and a pointed tip 26b which is not wide enough to pass around the cord. As the clamp is rolled up, tip 26b becomes slightly bowed but remains free of the cord. After the clamp 26 has been applied, the surplus cord is cut off close to the clamp along line 27, indicated in Fig. 13. Portion 24a is then doubled over to form another loop. Successive loops can thus be formed from a long piece of cord with a minimum of waste.

The finished loop 25 is attached to a garment, as shown in Fig. 14, by passing the clamp 26, tip first, through the garment wall 28. This fastener, like those previously described, has exceptional strength because the clamp can be applied very tightly while the cord is reduced in diameter by stretching. Furthermore, the portions of the cord inside wings 26a remain stretched after the clamp is closed and are thus immobilized so that they do not tend to work loose even if the loop is repeatedly stretched in use, as on a boot for example.

This application is a continuation-in-part of our pending application Serial No. 498,566, filed April 1, 1955, Fastener for Overshoes now abandoned.

What is claimed is:

1. A garment fastener comprising a piece of elastic cord formed in a loop and having end portions disposed alongside each other, and a clamping member enclosing and tightly gripping said end portions, portions of the cord inside said member being in longitudinally stretched condition.

2. A garment fastener comprising a piece of elastic cord formed in a loop having end portions disposed side by side with ends facing in the same direction, and a clamping member having a tubular portion surrounding and tightly gripping said end portions, all the portions of the cord inside said member being in longitudinally stretched condition, said clamping member having a longitudinally projecting portion which is free of the cord.

3. A garment fastener comprising a piece of elastic cord formed in a loop and having end portions disposed alongside each other, a first clamping member tightly clinched around said end portions, and a second clamping member surrounding the first member and extending along and gripping the cord to either side of the first member, portions of the cord inside said second member on either side of said first member being in longitudinally stretched condition.

4. A garment fastener as described in claim 3, said second clamping member also gripping another portion of the cord to form a double-ended loop.

5. A garment fastener comprising a piece of round elastic cord formed in a loop and having overlapped end portions with ends facing in opposite directions, a circular staple clinched around said overlapped portions, and a tubular clamp surrounding and tightly gripping said staple and portions of the cord to either side thereof, the latter portions of the cord being in longitudinally stretched condition, and said staple being disposed substantially in a radial direction with respect to said clamp.

6. A garment fastener comprising a piece of round elastic cord formed in a loop and having end portions disposed side by side and in part substantially at right angles with respect to the remainder of the cord, a circular staple clamped around said end portions, and a tubular clamp surrounding and tightly gripping said staple and portions of the cord to either side thereof, the latter portions being in longitudinally stretched condition, and said staple being disposed substantially in an axial direction with respect to the clamp.

7. A garment fastener as described in claim 6, said clamp having a second tubular portion gripping another part of the cord to form a double-ended loop.

8. The method of making elastic loop garment fasteners which comprises forming a piece of elastic cord into a loop by laying portions of the cord alongside each other, stretching the loop, applying a clamping member around said portions while the loop is stretched, and clinching said member sufficiently tightly to maintain stretched portions of the cord therein in stretched condition.

9. The method of making elastic loop garment fasteners which comprises forming a piece of elastic cord into a loop by laying portions of the cord alongside each other, applying a first clamping member around said portions, stretching the loop, applying a second clamping member around the first clamping member and portions of the loop adjacent thereto while the loop is stretched, and clinching the second clamping member sufficiently tightly to retain the latter portions in stretched condition.

10. The method of making garment fasteners as described in claim 9, which includes the step of stretching the cord while the first clamping member is being applied.

11. The method of making garment fasteners as described in claim 9, which includes the step of clinching a portion of the second clamping member to grip a part of the cord remote from the first fastener to form a double-ended loop.

12. The method of making elastic loop garment fasteners which comprises forming a loop from a continuous piece of elastic cord by laying one end of the piece beside an intermediate portion, gripping said end and said intermediate portion and stretching the loop, applying a clamping member around the loop adjacent said end while the loop is stretched, clinching said member sufficiently tightly to maintain the portions of the cord therein in stretched condition, and cutting off the piece adjacent said clamping member.

References Cited in the file of this patent

UNITED STATES PATENTS

| | | |
|---|---|---|
| 339,460 | Pilkington | Apr. 6, 1886 |
| 536,965 | Neuberger | Apr. 2, 1896 |
| 676,277 | Robertson | June 11, 1901 |
| 1,248,328 | Hoffman | Nov. 27, 1917 |
| 1,464,800 | Barth | Aug. 14, 1923 |